US009130677B2

(12) United States Patent
Mukai et al.

(10) Patent No.: US 9,130,677 B2
(45) Date of Patent: Sep. 8, 2015

(54) COMMUNICATION SYSTEM, STATION-SIDE OPTICAL LINE TERMINATING APPARATUS, USER-SIDE OPTICAL LINE TERMINATING APPARATUS, CONTROL APPARATUS, AND COMMUNICATION METHOD

(71) Applicant: MITSUBISHI ELECTRIC CORPORATION, Tokyo (JP)

(72) Inventors: Hiroaki Mukai, Tokyo (JP); Masaki Tanaka, Tokyo (JP); Daisuke Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/095,962

(22) Filed: Dec. 3, 2013

(65) Prior Publication Data
US 2014/0086584 A1    Mar. 27, 2014

Related U.S. Application Data

(62) Division of application No. 13/388,087, filed as application No. PCT/JP2011/059054 on Apr. 12, 2011, now Pat. No. 8,934,770.

(30) Foreign Application Priority Data
Apr. 13, 2010  (JP) ................ 2010-092120

(51) Int. Cl.
H04J 14/02     (2006.01)
H04B 10/27    (2013.01)
(Continued)

(52) U.S. Cl.
CPC ............. *H04B 10/27* (2013.01); *H04B 10/272* (2013.01); *H04B 10/40* (2013.01); *H04L 12/12* (2013.01);
(Continued)

(58) Field of Classification Search
CPC ........... H04B 14/0272; H04B 14/0273; H04B 14/0275; H04B 14/0276; H04B 10/40; H04B 10/272; H04Q 11/0067; H04Q 2011/0064; H04Q 2011/0079; H04L 12/12; Y02B 60/32; Y02B 60/34; Y02B 60/50; H04J 14/0282; H04J 14/0221
USPC ................................ 398/38, 66–73
See application file for complete search history.

(56) References Cited

U.S. PATENT DOCUMENTS
7,317,688 B2    1/2008  Mukai et al.
8,000,602 B2 *  8/2011  Haran et al. .................... 398/72
(Continued)

FOREIGN PATENT DOCUMENTS
JP    2004-64458    2/2004
JP    2004-172772   6/2004
(Continued)

OTHER PUBLICATIONS
Haran, O., et al., "ONU power-save annex," PMC-Sierra Inc., total 10 pages (Apr. 2008).
(Continued)

Primary Examiner — Leslie Pascal
(74) Attorney, Agent, or Firm — Oblon, McClelland, Maier & Neustadt, L.L.P.

(57) ABSTRACT

An optical communication system that connects a plurality of user-side optical line terminating apparatuses (hereinafter referred to as ONUs) to a station-side optical line terminating apparatus (hereinafter referred to as OLT) using a common optical fiber, wherein the ONU as at least a part of the ONUs includes a transceiver having a power saving function for inactivating a transmitting unit while supplying electric power to a receiving unit and a control apparatus that transmits support information of the power saving function to the OLT via the transceiver, and the OLT includes a control apparatus that generates transmission allowance information of upstream communication based on the support information of the power saving function and a transceiver that receives the support information of the power saving function and transmits the transmission allowance information to the ONU.

16 Claims, 13 Drawing Sheets

(51) Int. Cl.
  *H04B 10/272* (2013.01)
  *H04L 12/12* (2006.01)
  *H04Q 11/00* (2006.01)
  *H04B 10/40* (2013.01)

(52) U.S. Cl.
  CPC ......... *H04Q 11/0067* (2013.01); *H04J 14/0221* (2013.01); *H04J 14/0282* (2013.01); *H04Q 2011/0064* (2013.01); *H04Q 2011/0079* (2013.01); *Y02B 60/32* (2013.01); *Y02B 60/34* (2013.01); *Y02B 60/50* (2013.01)

(56) References Cited

U.S. PATENT DOCUMENTS

| | | | |
|---|---|---|---|
| 8,565,601 | B2 | 10/2013 | Nakura et al. |
| 8,774,621 | B2 | 7/2014 | Mukai |
| 2009/0263127 | A1 | 10/2009 | Haran et al. |
| 2009/0268653 | A1 | 10/2009 | Itagaki et al. |
| 2010/0111523 | A1 | 5/2010 | Hirth et al. |
| 2010/0118753 | A1 | 5/2010 | Mandin et al. |
| 2012/0063770 | A1 | 3/2012 | Tsuji |
| 2012/0148246 | A1 | 6/2012 | Mukai et al. |
| 2012/0177361 | A1 | 7/2012 | Hirano et al. |

FOREIGN PATENT DOCUMENTS

| | | |
|---|---|---|
| JP | 2005-252692 | 9/2005 |
| JP | 8-191273 | 11/2006 |
| JP | 2007-274534 | 10/2007 |
| JP | 2006-524929 | 11/2008 |
| JP | 2009-171424 | 7/2009 |
| JP | 2009-260970 | 11/2009 |
| JP | 2009-267936 | 11/2009 |
| JP | 2010-213259 | 9/2010 |
| WO | WO 2004/098096 A1 | 11/2004 |
| WO | WO 2008/062883 A1 | 5/2008 |

OTHER PUBLICATIONS

Office Action issued Feb. 4, 2014 in Japanese Patent Application No. 2011-149330 (with partial English translation).
International Telecommunication Union, "White Paper: Means and impact of GPON power conservation", Telecommunication Standardization Sector, Study Group 15, TD97 (WP 1/15), (Dec. 2008), XP17444919A.
Haran, Onn, "ONU power-save annex", PMC-Sierra Inc., pp. 1-12, (Apr. 2008).
International Telecommunication Union, "GPON power conservation", ITU-T Telecommunication Standardization Sector of ITU, Series G, Supplement 45, Total 44 pages, (May 2009).
International Telecommunication Union, "Amendment 1-Specification of the ONU registration method and various clarifications", ITU-T Telecommunication Standardization Sector of ITU, Series G, G.984.3, Amendment 1, Series G: Transmission Systems and Media, Digital Systems and Networks, Digital sections and digital line system-Optical line systems for local and access networks, Gigabit-capable Passive Optical networks (G-PON): Transmission convergence layer specification, Total 16 pages, (Feb. 2009), XP17436107A.
Mangin, Christopher and Mukai, Hiroaki, "Type B Optical Link Protection", Draft Contribution to IEEE 1904.1, TF3,Total 7 pages, (Server Date Oct. 18, 2010), XP17737894A.
IEEE P 1904.1, "Service iteroperability in Ethernet Passive Optical Networks (SIEPON)", pp. 9-1 to 9-18, (Aug. 2010), XP17739757A.
Draft Amendment to IEEE Std. 802.3-2008, IEEE 802.3zv 1OG-EPON Task Force, IEEE Draft P802.3av/D1.3, Section 93. Multipoint MAC Control, (Apr. 2008).
U.S. Appl. No. 13/698,509, filed Dec. 18, 2012, Mukai, et al.
U.S. Appl. No. 14/085,609, filed Nov. 20, 2013, Hirano, et al.

* cited by examiner

FIG.11

| ONU Serial No | ONU FUNCTION POWER SAVING MODE | USER ID | SERVICE ID (1) | SERVICE ID (2) | USER REQUEST POWER SAVING MODE |
|---|---|---|---|---|---|
| 2566941 | DOZE SLEEP | 100201 | BUSINESS | IPTV | DOZE |
|  |  |  |  | INTERNET |  |
| 9852234 | DOZE | 100202 | GENERAL | SERVER |  |
| 5551459 | DOZE SLEEP | 100203 | GENERAL | IP TELEPHONE | DOZE |
|  |  |  |  | INTERNET | SLEEP |
|  |  |  |  | IPTV |  |
| 1864257 | NONE | 100204 | BUSINESS | IP TELEPHONE |  |
|  |  |  |  | INTERNET |  |
| 1900014 | DOZE | 100205 | GENERAL | INTERNET |  |

FIG.12

| SERVICE ID (1) | PROHIBITED POWER SAVING MODE | | |
|---|---|---|---|
|  | DOZE | SLEEP | PSEUDO SLEEP |
| GENERAL |  |  |  |
| BUSINESS |  | DISAPPROVED | DISAPPROVED |

FIG.13

| SERVICE ID (2) | PROHIBITED POWER SAVING MODE | | |
|---|---|---|---|
| | DOZE | SLEEP | PSEUDO SLEEP |
| INTERNET | | | |
| IPTV | | | |
| IP TELEPHONE | | DISAPPROVED | |
| SERVER | DISAPPROVED | DISAPPROVED | DISAPPROVED |

FIG.14

| SERVICE ID (2) | MAXIMUM SLEEP TIME [ms] | | |
|---|---|---|---|
| | DOZE | SLEEP | PSEUDO SLEEP |
| INTERNET | 1000 | 500 | 1000 |
| IPTV | 200 | 100 | 100 |
| IP TELEPHONE | 400 | 200 | 200 |
| SERVER | 0 | 0 | 0 |

FIG.15

| SERVICE ID (2) | DEFAULT SLEEP TIME [ms] | | |
|---|---|---|---|
| | DOZE | SLEEP | PSEUDO SLEEP |
| INTERNET | x | y | z |
| IPTV | x | y | z |
| IP TELEPHONE | x | y | z |
| SERVER | 0 | 0 | 0 |

COMMUNICATION SYSTEM, STATION-SIDE OPTICAL LINE TERMINATING APPARATUS, USER-SIDE OPTICAL LINE TERMINATING APPARATUS, CONTROL APPARATUS, AND COMMUNICATION METHOD

CROSS REFERENCE TO RELATED APPLICATIONS

This application is a divisional of and is based upon and claims the benefit of priority under 35 U.S.C. §120 from U.S. application Ser. No. 13/388,087, filed on Jan. 31, 2012, which is the national stage of PCT/JP11/059054, filed Apr. 12, 2011, and the entire contents of both of which are incorporated herein by reference, and claims the benefit of priority under 35 U.S.C. §119 from Japanese Patent Application No. 2010-092120, filed Apr. 13, 2010.

FIELD

The present invention relates to a communication system in which a plurality of terminals are connected by a common line and a communication method and relates to, for example, a PON (Passive Optical Network) system including an OLT (Optical Line Terminal: a station-side terminating apparatus) and a plurality of ONUs (Optical Network Units: user-side terminating apparatuses).

BACKGROUND

In the PON system, the OLT and the ONUs perform communication in synchronization with each other to prevent data in an upstream direction transmitted from the ONUs from colliding with one another. The OLT plans to give transmission allowance to the ONUs to prevent the data in the upstream direction from colliding with one another. In the planning, the OLT takes into account delays due to distances between the OLT and the ONUs. Therefore, the OLT measures round-trip times between the OLT and the ONUs. However, because there is fluctuation in a transmission line such as jitter and wander in transmission by an optical fiber, it is necessary to periodically perform the measurement.

On the other hand, data communication is not always performed. The data communication is not performed at all, for example, at night. However, the measurement of round-trip times is periodically performed irrespective of presence or absence of the data communication as explained above. The ONUs are always set in a communicable state for the measurement of round-trip times even if the data communication is not performed. This leads to a waste of electric power. Therefore, a technology for intermittently transitioning the ONUs to a power saving state by requesting a shift to the power saving state from the ONUs is considered. A PON system that, when there is no upstream data from an ONU, does not uselessly allocate a transmission bandwidth to such an ONU and improves throughput is considered (Patent Literature 1). In this PON system, when an OLT detects a state in which there is no user data for a fixed period set in advance, the OLT deletes the registration of an ONU and notifies the ONU that an optical link is temporarily stopped. Thereafter, no transmission bandwidth is allocated to the ONU and transmission of a frame for maintaining a link is suppressed. Therefore, the ONU can reduce the number of times of transmission of the frame.

CITATION LIST

Patent Literature

Patent Literature 1: Japanese Patent Application Laid-open No. 2007-274534

SUMMARY

Technical Problem

In the PON system described in Patent Literature 1, because a link to an ONU that does not transmit fixed data is disconnected, a burden on the ONU can be reduced. However, when the ONU resumes transmission of upstream data, the OLT performs again discovery processing for discovering an unconnected ONU, establishes a link anew, and re-registers the ONU. Therefore, there is a problem in that, for example, when communication at a low bit rate continues, this communication method cannot be used.

Solution to Problem

In order to solve the aforementioned problems, an optical communication system that connects a plurality of user-side optical line terminating apparatuses (hereinafter referred to as ONUs) to a station-side optical line terminating apparatus (hereinafter referred to as OLT) using a common optical fiber according to one aspect of the present invention is constructed such that the ONU as at least a part of the ONUs includes a transceiver having a power saving function for inactivating a transmitting unit while supplying electric power to a receiving unit and a control apparatus that transmits support information of the power saving function to the OLT via the transceiver, and the OLT includes a control apparatus that generates transmission allowance information of upstream communication based on the support information of the power saving function and a transceiver that receives the support information of the power saving function and transmits the transmission allowance information to the ONU.

A station-side optical line terminating apparatus according to another aspect of the present invention is constructed in such a manner as to include a control apparatus that receives support information of a power saving function from the user-side optical line terminating apparatus and selects, based on this support information, a power saving protocol used for communication with the user-side optical line terminating apparatus from a plurality of power saving protocols having different communication procedures.

An user-side optical line terminating apparatus according to another aspect of the present invention is constructed in such a manner as to include: an optical transceiver connected to the optical fiber and including a power saving function for inactivating transmission while continuing reception; and a control apparatus that transmits support information of the power saving function to the station-side optical line terminating apparatus and controls, based on regulation information received beforehand from the station-side optical line terminating apparatus, propriety of a shift to a power saving mode of the optical transceiver.

A communication method according to further aspect of the present invention is constructed in such a manner as to include: the master station apparatus detecting a power saving function of the slave station apparatus; the master station apparatus determining a power saving protocol based on the detected power saving function of the slave station apparatus; and the master station apparatus controlling, using the determined power saving protocol, intermittent supply of transmitter power or receiver power of the slave station apparatus.

The communication method as described above according to still further aspect of the present invention is constructed in such a manner as to further include a step in which the master station apparatus transmits a signal for adjusting a supply suspension time of transmitter power or receiver power of the slave station apparatus to the slave station apparatus.

Advantageous Effects of Invention

The communication method, the optical communication system, the station-side optical line terminating apparatus, the user-side optical line terminating apparatus, and the control apparatus according to the present invention can reduce power consumption while continuing intermittent communication.

BRIEF DESCRIPTION OF DRAWINGS

FIG. 11 is a table of ONUs and data of services in the second embodiment of the present invention.

FIG. 12 is a table of a service and a prohibited power saving mode in the second embodiment of the present invention.

FIG. 13 is a table of a service and a prohibited power saving mode in the second embodiment of the present invention.

FIG. 14 is a table of a service and a maximum sleep time in the second embodiment of the present invention.

FIG. 15 is a table of a service and data of a default sleep time in the second embodiment of the present invention.

DESCRIPTION OF EMBODIMENTS

First Embodiment

Hardware Configuration

Figure 1:
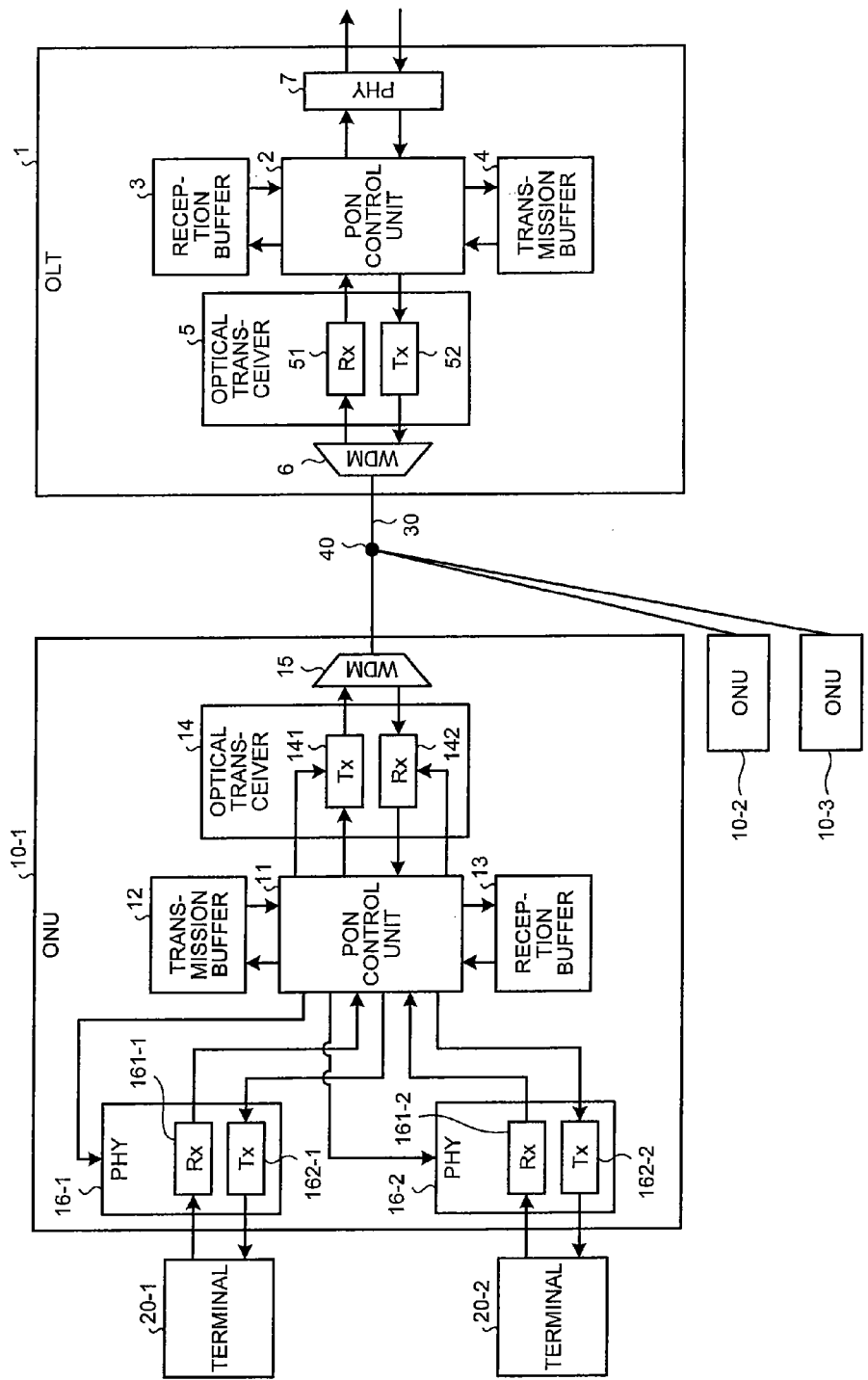
FIG. 1 is a diagram of the configuration of a communication system in an embodiment of the present invention.

FIG. 1 is a diagram of a configuration example of a PON system according to a first embodiment of the present invention. As shown in FIG. 1, the PON system according to this embodiment includes an OLT 1 (a master station apparatus) and ONUs 10-1 to 10-3 (slave station apparatuses). The OLT 1 and the ONUs 10-1 to 10-3 are connected by a subscriber line 30 via a splitter 40. The splitter 40 divides the subscriber line 30 connected to the OLT 1 into the number of the ONUs 10-1 to 10-3. The ONU 10-1 is connected to terminals 20-1 and 20-2. In an example explained here, three ONUs are provided. However, the number of ONUs is not limited to this and may be any number.

The OLT 1 includes a PON control unit 2 that carries out processing on the OLT side based on a PON protocol, a reception buffer, which is a buffer for storing upstream data received from the ONUs 10-1 to 10-3, an optical transceiver 5 that performs transmission and reception processing for an optical signal, a WDM (Wavelength Division Multiplexing) coupler (WDM) 6 that wavelength-multiplexes the upstream data and the downstream data, and a physical-layer processing unit (PHY) 7 that realizes a physical interface function of an NNI (Network Node Interface) between the OLT 1 and a network. The optical transceiver 5 includes an optical receiver (Rx: Receiver) 51 that performs reception processing and an optical transmitter (Tx: Transmitter) 52 that performs transmission processing.

The ONU 10-1 includes a PON control unit 11 that carries out processing on the ONU side based on the PON protocol, a transmission buffer (an upstream buffer) 12, which is a buffer for storing transmission data (upstream data) to the OLT 1, a reception buffer (a downstream buffer) 13, which is a buffer for storing reception data (downstream data) from the OLT 1, an optical transceiver 14, a WDM 15 that wavelength-multiplexes the upstream data and the downstream data, and physical-layer processing units (PHYs) 16-1 and 16-2 that realize a physical interface function of a UNI (User Network Interface) respectively between the ONU 10-1 and the terminals 20-1 and 20-2.

The optical transceiver 14 includes an optical transmitter (Tx: Transmitter) 141 that performs transmission processing and an optical receiver (Rx: Receiver) 142 that performs reception processing. The PON control unit 11 is connected to the optical transceiver 14 by a signal line for power saving control to control any one of the optical transmitter 141 and the optical receiver 142 or both to be an ON state and an OFF state. In a communication system according to this embodiment, (1) the ONU 10 that can control only the transmitter 141 to a power saving mode, (2) the ONU 10 that can control the transmitter 141 and the receiver 142 to the power saving state, (3) and the ONU 10 that cannot cope with control of the power saving state of the transmitter 141 and the receiver 142 are mixed. The PHY 16-1 includes a receiving unit (Rx: Receiver) 161-1 that performs reception processing and a transmitting unit (Tx: Transmitter) 162-1 that performs transmission processing. The PHY 16-2 includes a receiving unit (Rx: Receiver) 161-2 that performs reception processing and a transmitting unit (Tx: Transmitter) 162-2 that performs transmission processing.

Two terminals are connected to the ONU 10-1. However, the number of terminals is not limited to this and may be any number. The ONU 10-1 includes physical-layer processing units (PHYs) corresponding to the number of terminals. In FIG. 1, the configuration example of the ONU 10-1 is explained as a representative. However, the ONUs 10-2 and 10-3 have a configuration same as that of the ONU 10-1.

Like the PON system in the past, the PON control unit 2 of the OLT 1 performs bandwidth allocation for upstream data to give transmission allowance respectively to the ONUs 10-1 to 10-3 to prevent transmission time frames from overlapping one another and prevents collision of transmission data of the ONUs 10-1 to 10-3. Any method can be used for this bandwidth allocation. However, for example, the Dynamic Bandwidth Allocation Algorithm described in 'Su-il Choi and Jae-doo, "HuhDynamic Bandwidth Allocation Algorithm for Multimedia Services over Ethernet (registered trademark) PONs", ETRI Journal, Volume 24, Number 6, December 2002 p. 465 to p. 466'.

An overall operation of the OLT 1 and the ONUs 10-1 to 10-3 according to this embodiment is explained. The PON control unit 2 stores, in a transmission buffer 4, downstream data (downstream communication data) received from a network through the PHY 7. When data is transmitted from the OLT 1, the PON control unit 2 reads out the downstream data stored in the transmission buffer 4 and outputs the downstream data to the optical transceiver 5, the Tx 52 of the optical transceiver 5 outputs transmission data to the WDM 6 as an optical signal, and the WDM 6 applies wavelength multiplexing to the optical signal output from the optical transceiver 5 and outputs the optical signal to the ONUs 10-1 to 10-3 as a downstream signal through the subscriber line 30. When the PON control unit 2 transmits a control message for transmission bandwidth allocation or the like for transmitting an instruction for a transmission allowance, the PON control unit 2 outputs the control message generated by the PON control unit 2 to the optical transceiver 5 and thereafter transmits the control message to the ONUs 10-1 to 10-3 in the same manner as the downstream data. In the PON system shown in FIG. 1, the WDMs 6 and 15 are used to perform wavelength multiplexing. However, when communication is performed in a single wavelength, the WDMs 6 and 15 are not essential.

In the ONUs 10-1 to 10-3, when the downstream signal is received from the OLT 1, the WDM 15 separates the downstream signal and outputs the downstream signal to the optical transceiver 14 and the Rx 142 of the optical transceiver 14 converts the downstream signal into downstream data of an electric signal and outputs the downstream data to the PON control unit 11. The PON control unit 11 stores, in the reception buffer 13, the downstream data output from the Rx 142 of the optical transceiver 14. The PON control unit 11 reads out the downstream data stored in the reception buffer 13 and outputs the downstream data to both or one of the PHYs 16-1 and 16-2 according to a destination of the data. The PHYs 16-1 and 16-2 that receive the downstream data carry out predetermined processing on the downstream data and transmit the downstream data to the terminals 20-1 and 20-2 to which the PHYs 16-1 and 16-2 are connected.

On the other hand, when upstream data is transmitted from the ONUs 10-1 to 10-3, the PON control unit 11 stores, in the transmission buffer 12, the upstream data acquired from the terminals 20-1 and 20-2 through the PHYs 16-1 and 16-2. The PON control unit 11 reads out, based on a transmission bandwidth given from the OLT 1, the transmission data stored in the transmission buffer and outputs the transmission data to the optical transceiver 14. The Tx 141 of the optical transceiver 14 converts the upstream data into an optical signal (an upstream signal) and transmits the optical signal to the OLT 1 through the WDM 15 and the subscriber line 30.

The PON control unit 2 of the OLT 1 stores, in a reception buffer 3, the upstream data received from the ONUs 10-1 to 10-3 through the subscriber line 30, the WDM 6, and the Rx 51 of the optical transceiver 5. The PON control unit 2 reads out the upstream data stored in the reception buffer 3 and outputs the upstream data to the network through the PHY 7.

In the ONUs 10-1 to 10-3, concerning the control message from the OLT 1, the PON control unit 11 receives the control message through the WDM 15 and the Rx 142 of the optical transceiver 14 and performs, for example, implementation of an operation based on an instruction of the control message and generation of a response to the control message.

ONU Characteristic Adaptive Power Save

Figure 2:
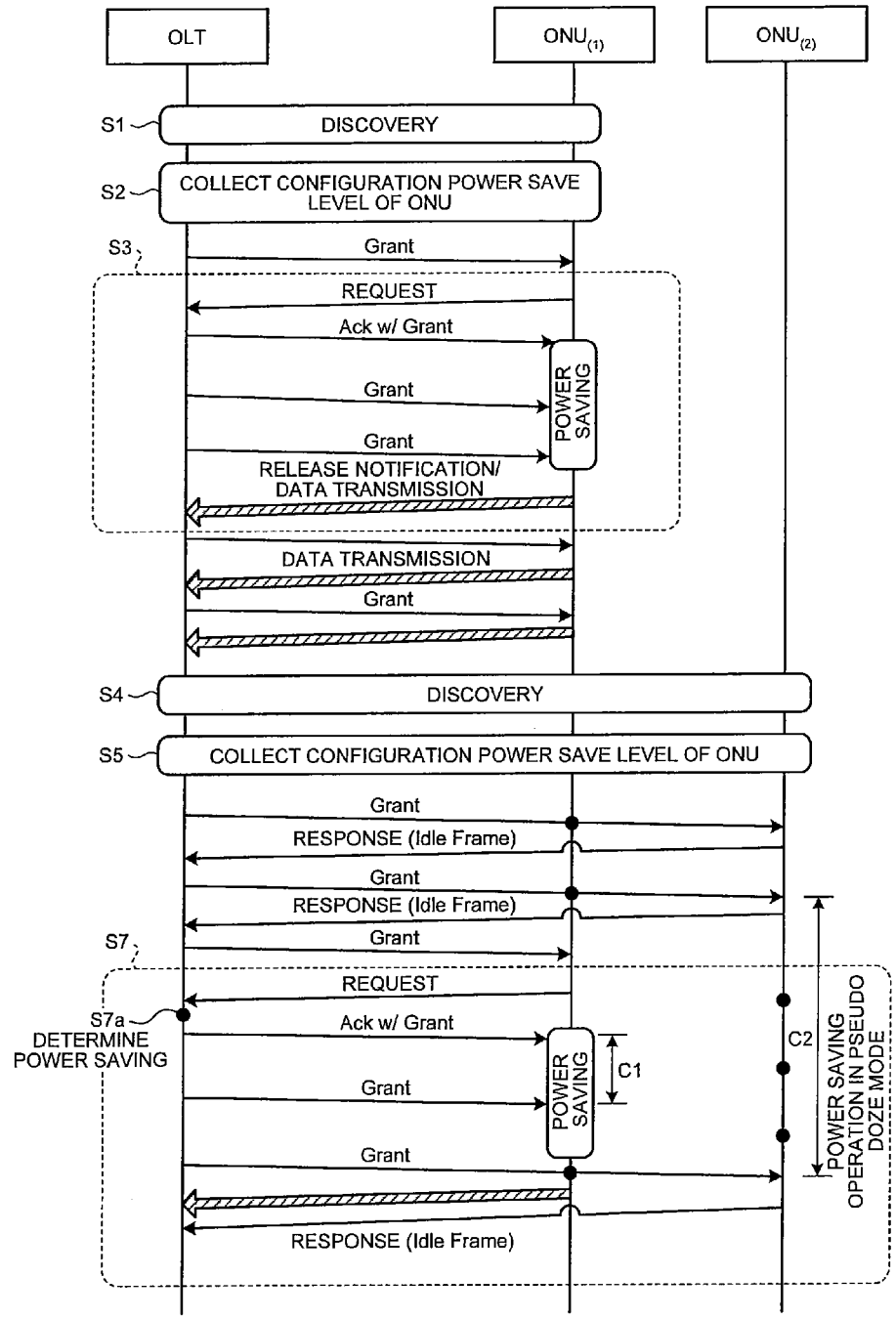
FIG. 2 is a sequence chart for explaining a communication method in a first embodiment of the present invention.

As an example of power saving operation of the communication system, a power save operation of the PON system is explained with reference to FIG. 2. In a communication system shown in FIG. 2, an ONU (1) having a power saving function and an ONU (2) not having the power saving function are connected to one OLT 1. In FIG. 2, control in which the OLT 1 causes the ONU 10 to operate in a power saving state according to the capability of the ONU 10 is shown.

First, at step S1, the OLT 1 performs a discovery processing to find an active ONU 10. The OLT 1 broadcasts a control message for discovery to downstream communication. The ONUs 10 that receive this control message return serial numbers and the like of the ONUs to the OLT 1. Because all the ONUs 10 in a communicable state return response messages, the OLT 1 can discover the ONU 10 in an active state. In this example, a power supply to the ONU (2) is disconnected and the ONU (2) does not return a response message.

Subsequently, the OLT 1 exchanges various parameters concerning the capability of the ONU 10 and communication conditions with the ONU 10 discovered at step S1 and performs condition setting for communication between the OLT 1 and the ONU 10 (step S2). The ONU 10 transmits support information of the power saving function of the ONU 10 to the OLT 1 as a power save level. This support information includes power supply control information of a transceiver and continuation time (sleep_time) of the power saving mode. The power supply control information is, for example, data of any one of [1] a doze mode (Doze/Dozing mode): the transmission function (Tx) is off and the reception function [Rx] is on, [2] a sleep mode (or Cyclic sleep): the transmission function (Tx) and the reception function [Rx] are periodically turned off, and [3] not corresponding to the power saving mode or, when the power saving function corresponds to a plurality of modes, data in which those modes are listed.

When the configuration ends, the OLT 1 shifts to a normal communication state. The OLT 1 allocates bandwidths for upstream communication to the ONUs 10 and transmits the bandwidths to the ONUs 10 as transmission allowance information (Grant or Gate). The OLT 1 can store this Grant in a frame together with other data and transmit the Grant to the ONUs 10 or can individually transmit the Grant.

The ONU 10 that receives the Grant starts data transmission. However, in the following explanation, there is no transmission data and the ONU 10 shifts to the power saving mode (step S3). When the ONU 10 shifts to the power saving mode, the ONU 10 transmits a request signal to the OLT 1. The OLT 1 determines, based on, for example, the various kinds of information of the ONU 10 acquired at step S2 and a state of upstream and downstream communication with the ONU 10, whether the shift to the power saving mode is allowed and transmits a allowance signal (a non-allowance signal) to the ONU 10. When the ONU 10 receives the allowance signal, the ONU 10 turns off a power supply for the transmitting unit 141 (or the transmitting unit 141 and the receiving unit 142) and reduces electric power consume by the optical transceiver 14.

According to a configuration result at step S2, the OLT 1 could allow a power saving mode different from the power saving mode requested by the ONU 10, change setting of time for temporarily turning off the power supply for the transmitter 141 or the like during power saving, and notifies the ONU 10 of the allowance of the power saving mode and the change of the setting.

At step S3, the OLT 1 allocates Grant to the ONU 10 in the power saving mode as well. This is for the purpose of enabling the ONU 10 to transmit data with a short delay when upstream data is generated in the ONU 10. The OLT 1 can allocate this Grant every time concerning bandwidth update periods or can allocate the Grant at an interval of once in several times taking into account the fact that upstream communication is not often performed. For example, it is conceivable to allocate the Grant every time in the doze mode and allocate the Grant at a curtailed interval in the sleep mode.

Figure 3:
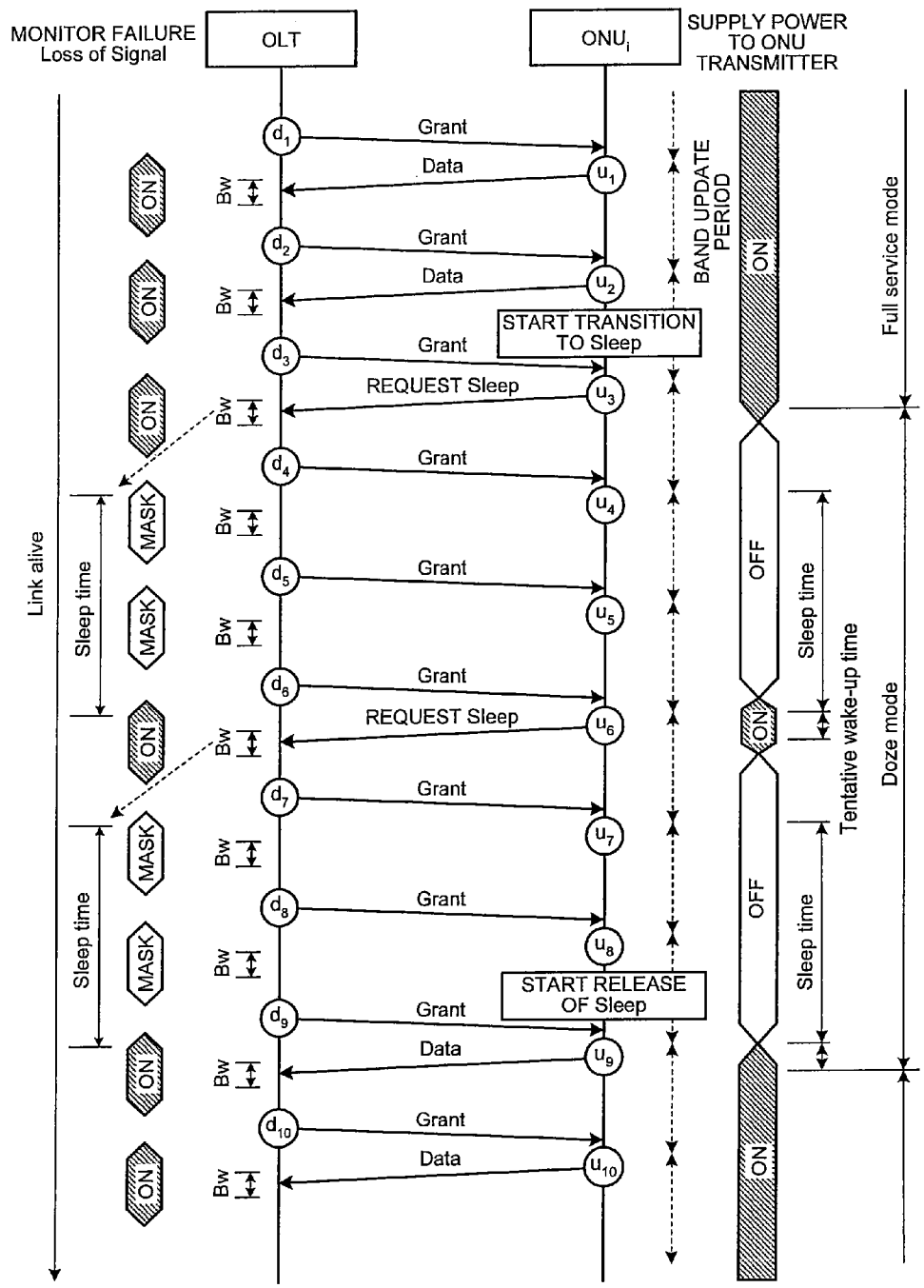
FIG. 3 is a sequence chart for explaining a communication method in a power saving mode in the first embodiment of the present invention.

Even during the power saving mode, the OLT 1 and the ONU 10 continue the communication. This state is shown in FIG. 3. The ONU 10 enters the power saving mode at timing U3. However, in the doze mode, the ONU 10 receives downstream data together with Grant. On the other hand, concerning the upstream communication, the ONU 10 temporarily turns on the power supply for the transmitter 141 at timing U6 after the end of a predetermined time (sleep time), transmits a request (a sleep request), and maintains a link. Thereafter, the ONU 10 turns off the power supply for the transmitter 141 again. When the transmitter 141 is temporarily in the ON state, the ONU 10 can also transmit other control information and small data in the allocated bandwidth. Concerning controlling for using the power saving function while maintaining a link, the applicant explains the control in PCT/JP2010/002054. This application is cited and included in this application.

Referring back to FIG. 2, the explanation of the power saving control based on the capability of the ONU 10 is continued. The ONU 10 monitors generation of upstream data equal to or larger than a predetermined threshold and the start of communication of a terminal (a connected apparatus) that requests a large bandwidth. The ONU 10 determines release of the power saving mode based on a result of this monitoring. The ONU 10 performs this release by transmitting a release message or transmitting data.

Control performed when the ONU (2) not having the power saving function and not supporting a power saving protocol is started is explained. When the ONU (2) is discovered by the periodical discovery of the OLT 1 (step S4) and the configuration (step S5) ends, the ONU (2) starts communication. When the OLT 1 transmits Grant to the ONU (1) and the ONU (2) as usual, the ONU (2) transmits an Idle Frame as a response even when there is no upstream data. The ONU (2) transmits the Idle frame because, when the Idle frame is not transmitted, LOSi (Loss of Signal for ONUs i) is detected and a link is disconnected. However, it is a waste of power consumption of the ONU 10 and a bandwidth to transmit the frame although there is no transmission data.

Therefore, when the OLT 1 determines, based on the result of the configuration, that the ONU (2) operates for a long time (equal to or larger than a predetermined threshold) in such a state, the OLT 1 determines to cause the ONU (2) to operate substantially in the power saving state (step S7a). In the example shown in FIG. 2, because a request for the power saving mode is received from the ONU (1), the OLT 1 starts, based on the result of the configuration, communication with the ONU (1) supporting the power saving mode in, for example, a power saving protocol of the doze mode and with the ONU (2) not supporting the power saving mode in a power saving protocol by a pseudo doze mode.

The power saving protocol by the pseudo doze mode is a protocol in which a transmission interval of Grant is set to, for example, once in ten periods of a bandwidth update period and the Grant is curtailed from that before a shift to the pseudo doze mode. Consequently, because the transmission of the Idle frame decreases, electric power consumed for the upstream communication can be saved. In the pseudo doze mode, when the ONU 10 is given Grant, the ONU 10 definitely returns a response.

On the other hand, a rule of the power saving protocol of the doze mode specifies that, even if the ONU 10 is given Grant, it is unnecessary to return a response when there is no transmission data. Instead of a response returned every time, to detect a failure in a communication path, the ONU 10 returns a response frame at least once in a period set in sleep time. In the doze mode, the Grant is more frequently given than in the pseudo doze mode. C2 in FIG. 2 indicates an interval of the Grant given in the pseudo doze mode. It is seen that this interval C2 is longer than an interval C1 given in the doze mode and, therefore, a transmission interval of the Idle Frame is long and power consumption of the ONU (2) is suppressed.

The power saving protocol of the doze mode has a characteristic that transmission of a response frame can be suppressed and a transmission delay during the occurrence of upstream communication can be eliminated or reduced according to a short transmission interval of the Grant.

As explained above, in the communication system according to this embodiment, it is possible to change the power saving protocol based on the support information of the power saving function and suppress power consumption according to characteristics of the respective ONUs. This communication system can apply control for suppressing power consumption to the ONU 10 not having the power saving function and not supporting the power saving protocol such as the ONU (2).

Configuration Details and Selection of a Power Saving Mode

Figure 4:
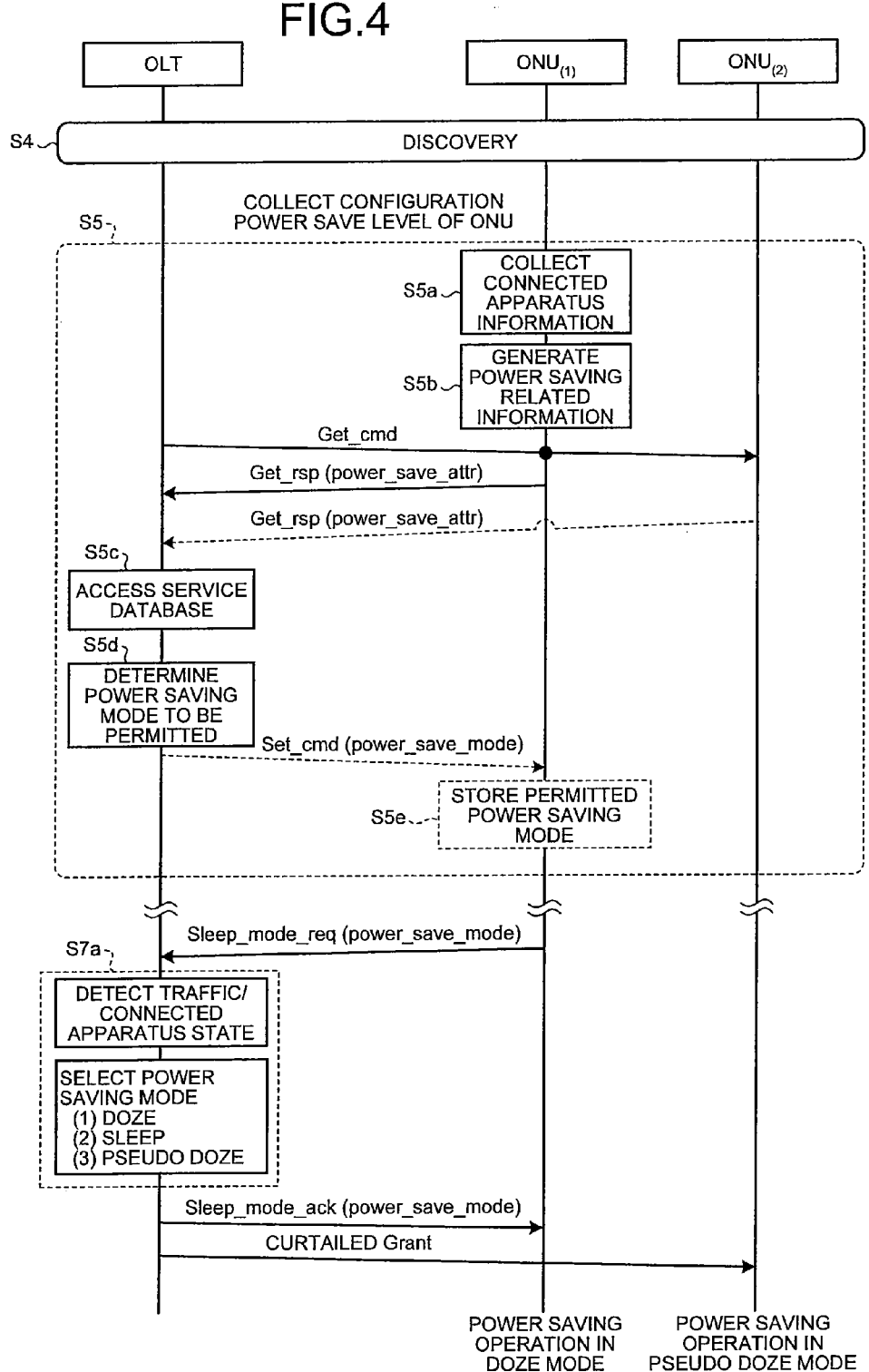
FIG. 4 is a sequence chart for explaining configuration control and sleep control in the first embodiment of the present invention.

Configuration details are explained with reference to FIG. 4. In FIG. 4, reference signs same as those in FIG. 2 denote the same or equivalent processing. Step S5 indicates details of the configuration operation shown in FIG. 2.

The ONU 10 collects information concerning attributes including a type of a connected apparatus such as the terminal 20-1, ON/OFF, a type of a line, and speed (step S5a) and combines the information with information concerning a function and performance of the own apparatus recorded in a storage device of the own apparatus to generate attribute information (step S5b). The ONU 10 records the support information (power_save_attr) of the power saving function as this attribute information.

When the discovery ends, for configuration, the OLT 1 transmits a request command (Get_cmd) for the attribute information of the ONU 10. The ONUs 10 return attribute information in response frames (Get_rsp) in response to this request command. In some case, the ONU (2) not supporting the power saving function does not transmit the support information (power_save_attr) of the power saving function.

When the OLT 1 receives the response frames (Get_rsp), the OLT 1 stores the response frames in a recording device (a data base) of its own in a format shown in FIG. 11 explained later. Similarly, the OLT 1 checks, based on a contract for each user recorded in the recording device in advance, limitations of a power saving mode for each user and each provided service (step S5c) and determines power saving modes allowed to the ONUs 10 and conditions for the allowance (step S5d). Examples of the limitations are shown in FIGS. 11 to 15. For example, when the user uses a communication line for a server requested to respond quickly, it is undesirable that the ONU 10 shifts to the power saving mode and a delay occurs. The OLT 1 and the ONU 10 can suppress such an undesirable delay in advance by checking the allowed power saving mode in advance.

Subsequently, the OLT 1 transmits the determined allowed power saving mode using a command frame (Set_cmd). The ONU 10 records the received allowed power saving mode in the storage device of the own apparatus (step S5*e*).

The ONU 10 determines, based on the recorded allowed power saving mode, a power saving mode in use and propriety of a shift to the power saving mode. In shifting to the power saving mode, the ONU 10 transmits the request (sleep_mode_req) together with the parameters of the requested power saving mode as explained above. The OLT 1 that receives the request detects a state (presence or absence and an amount) of traffic of upstream or downstream communication, a type of a link, and a connected apparatus (a type, ON/OFF, etc.) on the ONU 10 side and selects a power saving mode based on the information concerning the requested power saving mode, the detection result, and the allowed power saving mode. The OLT 1 returns a result of the selection to the ONU 10 using a response frame (sleep_mode_ack).

The OLT 1 monitors traffic of the ONU (2) not having the power saving mode as well and determines whether the ONU (2) should shift to the power saving mode. Therefore, even if the ONU (2) does not transmit a request, the OLT 1 can control the ONU (2) to a substantial power saving state.

Selection of Different Power Saving Modes

Figure 5:
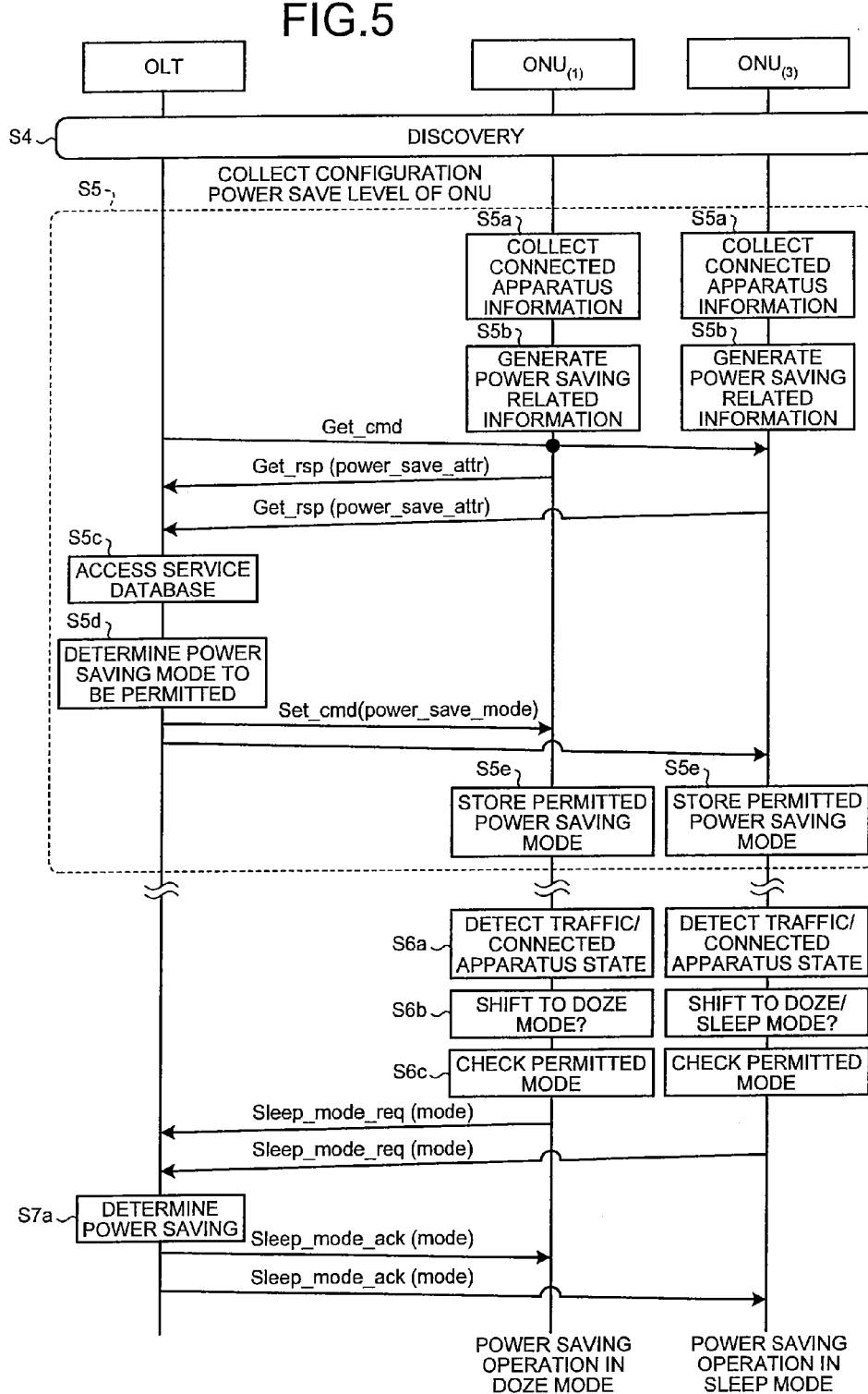
FIG. 5 is a sequence chart for explaining the configuration control and the sleep control in the first embodiment of the present invention.

Processing for selecting different types of power saving protocols for a plurality of ONUs 10 having the power saving function according to characteristics of the ONUs 10 is explained. In FIG. 5, reference signs same as those in FIG. 4 denote the same or equivalent processing. The ONU (1) has only the power saving function corresponding to the doze mode. The ONU (3) has the power saving function corresponding to the doze mode and the sleep mode. In other words, the ONU (1) can turn off the power supply for only the transmitter 141 but the ONU (3) can independently control the power supplies for the transmitter 141 and the receiver 142.

It is assumed that, after the configuration ends and communication is started, both ONUs are in a situation in which the ONUs can shift to the power saving mode; for example, a situation in which only intermittent and small amount data communication by web browsing or sound communication in a small bandwidth occurs, or in which a power supply for only an IP telephone is on and in a waiting state. The ONU 10 detects these situations of traffic by performing monitoring of a transmission buffer and state monitoring for a connected apparatus. When the situations respectively satisfy conditions set in advance, the ONU 10 determines a shift to the power saving mode. For example, when a total amount or an average of upstream traffic and downstream traffic in a predetermined period falls below a threshold, the ONU 10 performs the determination of a shift according to a state of a connected apparatus, a comparison table of power saving modes to which the ONU 10 can shift, and the like (steps S6*a* and S6*b*).

At step S6*c*, the ONU 10 checks, by accessing the storage device, whether the power saving mode determined from the traffic state and the like corresponds to the power saving mode allowed by the OLT 1. If the determined power saving mode is the allowed mode, the ONU 10 transmits the request (sleep_mode_req) to the OLT 1. At this point, when the determined mode does not correspond to the allowed mode, the ONU 10 changes the mode to a mode corresponding to the allowed mode or suppresses the transmission of the request. The ONU 10 can save useless consumption of a bandwidth and electric power required for processing by suppressing the request not corresponding to the allowed mode.

The OLT 1 receives requests from the ONUs 10 and determines whether the requests can be allowed or determines power saving modes adapted to the attribute information of the ONUs 10 (step S7*a*) and returns the power saving modes to the ONUs 10. For example, even when a request to shift to the doze mode is received from the ONU (3), when the OLT 1 determines that there is no downstream communication, the OLT 1 can change the mode to shift to the sleep mode and can return a response frame to the ONU (3) supporting the sleep mode. On the other hand, because it is known that the ONU (1) supports only the doze mode, even in the same situation, the OLT 1 does not perform a change to the sleep mode and, as requested from the ONU (1), returns a response frame designating the doze mode.

According to the processing explained above, thereafter, the ONU (1) operates in the doze mode and the ONU (3) operates in the sleep mode.

It is also possible to perform the request from the ONU 10 in a form not designating a power saving mode. In this case, the OLT 1 selects a power saving mode based on the support information and the attribute information of the ONU 10 obtained by the configuration and notifies the ONU 10 of the power saving mode.

Mode Change Between Power Saving Modes

Figure 6:
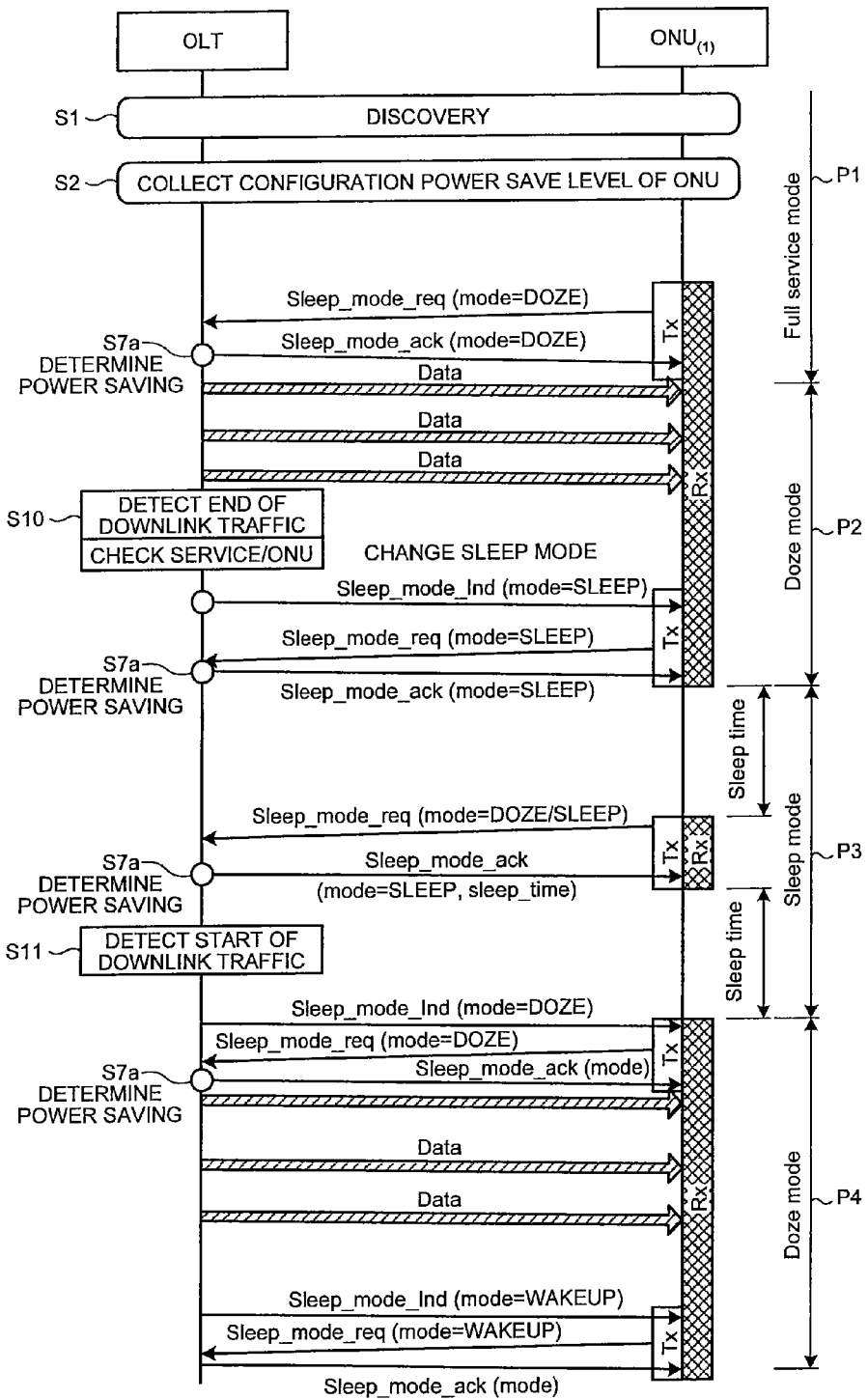
FIG. 6 is a sequence chart for explaining a sleep protocol in the first embodiment of the present invention.

A mode change between power saving modes is explained with reference to FIG. 6. In FIG. 6, reference signs same as those in FIG. 2 denote the same or equivalent processing. This protocol is an example. The present invention is not limited to various transmission frames, names of the transmission frames, and procedures shown in FIG. 6.

In FIG. 6, a state in which the ONU 10 shifts from the doze mode to the sleep mode and thereafter shifts to the doze mode again is shown. The ONU 10 could spontaneously execute, based on the determination of the ONU 10 explained at steps S6*a* to S6*c* in FIG. 5, this mode change between a plurality of power saving modes. However, the OLT 1 can also instruct the shift of a mode. The instruction of the shift of a mode by the OLT 1 is explained as an example below.

The ONU 10 operating in a period P1 designates the doze mode and transmits the request (sleep_mode_req) and shifts to the doze mode in a period P2. After shifting to the doze mode, the ONU 10 maintains power supply to the receiver 142 and, on the other hand, cuts power supply to the transmitter 141 and starts operation with power consumption suppressed. In FIG. 6, Tx and Rx respectively indicate power-on states of the transmitter 141 and the receiver 142 (periods without the description of Tx or Rx indicate a power-off state).

In the period P2, because the receiver 142 is in an ON state, the OLT 1 can transmit downstream data. Although not shown in the figure, the OLT 1 gives Grant to the ONU 10 together with the downstream data. The ONU 10 receives the Grant. However, when there is no transmission data, the ONU 10 does not supply electric power to the transmitter 141 and suppresses power consumption.

When the downstream traffic transmitted from the OLT 1 to the ONU 10 ends at step S10, the OLT 1 detects the end of the downstream traffic from a monitoring result of the transmission buffer 4 and the like, checks a result of configuration at step S2 stored in the storage device, and determines whether downstream communication is also set in a power saving mode. The detection of the end of the downstream traffic is performed according to, for example, whether the downstream traffic in a fixed period decreases to be equal to or smaller than a predetermined threshold.

When the OLT 1 determines to perform a change from the doze mode to the sleep mode, the OLT 1 transmits a sleep mode change instruction (sleep_mode_Ind) with a designated mode (SLEEP) to the ONU 10. The ONU 10 that receives this change instruction transmits sleep_mode_req as in the shift to the normal power saving mode. When sleep_mode_ack is returned from the OLT 1, the ONU 10 switches a power saving mode from the doze mode to the sleep mode. The ONU 10 cuts the power supply to the receiver 142 and operates in a state in which power consumption is further suppressed.

In the sleep mode, the ONU 10 repeats power-off and power-on at a fixed or variable period called cyclic sleep. A period for which the power supply is turned off is designated by a parameter called Sleep time. The "Sleep time" can be a default value determined by the configuration or can be a value designated by sleep_mode_ack (sleep_mode_req). For example, when the "Sleep time" is not designated by sleep_mode_ack (sleep_mode_req), the ONU 10 and the OLT 1 use the default value.

The ONU 10 temporarily turns on the power supplies for the transmitter 141 and the receiver 142 according to the "Sleep time" and notifies the OLT 1 as to whether the sleep mode is continued (sleep_mode_req). The OLT 1 can confirm, by receiving sleep_mode_req, that a line failure has not occurred between the OLT 1 and the ONU 10. The OLT 1 returns sleep_mode_ack in response to sleep_mode_req. At this point, the OLT 1 can simultaneously transmit a small amount of downstream data as well. The OLT 1 can also adjust the Sleep time according to data accumulation information of the transmission buffer, an increase or decrease in the data accumulation information and the like, and transmit sleep_mode_ack to the ONU 10 (an option function). For example, when a data accumulation amount of the transmission buffer increases, the OLT 1 changes the Sleep time to be short. When the data accumulation amount decreases or a state in which there is no data lasts for a fixed period, the OLT 1 changes the Sleep time to be long.

Next, occurrence or an increase of downstream traffic during the sleep mode is explained. When a situation change of traffic, occurrence of new communication, or the like by the monitoring of the transmission buffer is detected, the OLT 1 determines whether the sleep mode is changed (step S11). When the OLT 1 changes the sleep mode, the OLT 1 transmits a change request (sleep_mode_Ind) to the ONU 10. At this point, when the OLT 1 determines that the traffic increases only in downstream communication, the OLT 1 can instruct the ONU 10 to change the sleep mode to the doze mode. This instruction produces an effect that it is possible to reduce electric power consumed by the ONU 10 compared with electric power consumed when the ONU 10 shifts from the sleep mode to a full service mode (in which both Tx and Rx are both in the ON state).

Figure 7:
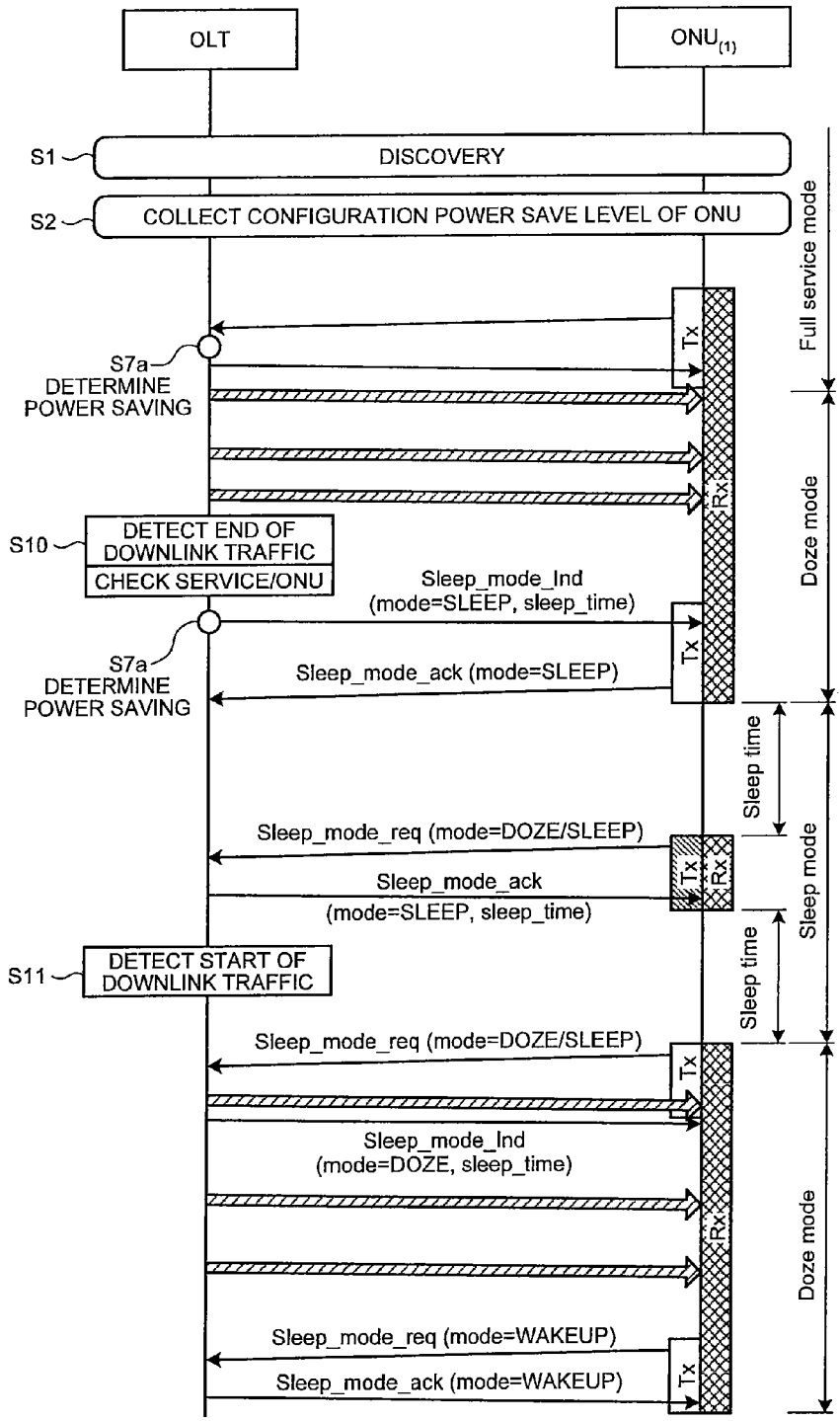
FIG. 7 is a sequence chart for explaining another example of the sleep protocol in the first embodiment of the present invention.

The OLT 1 can designate the Sleep time in the change request (sleep_mode_Ind). In the example shown in FIG. 6, the three messages sleep_mode_Ind, sleep_mode_req, and sleep_mode_ack are used for the mode change between the doze mode and the sleep mode. However, as shown in FIG. 7, a mode can also be changed according to the messages sleep_mode_Ind and sleep_mode_ack.

Second Embodiment

Figure 8:
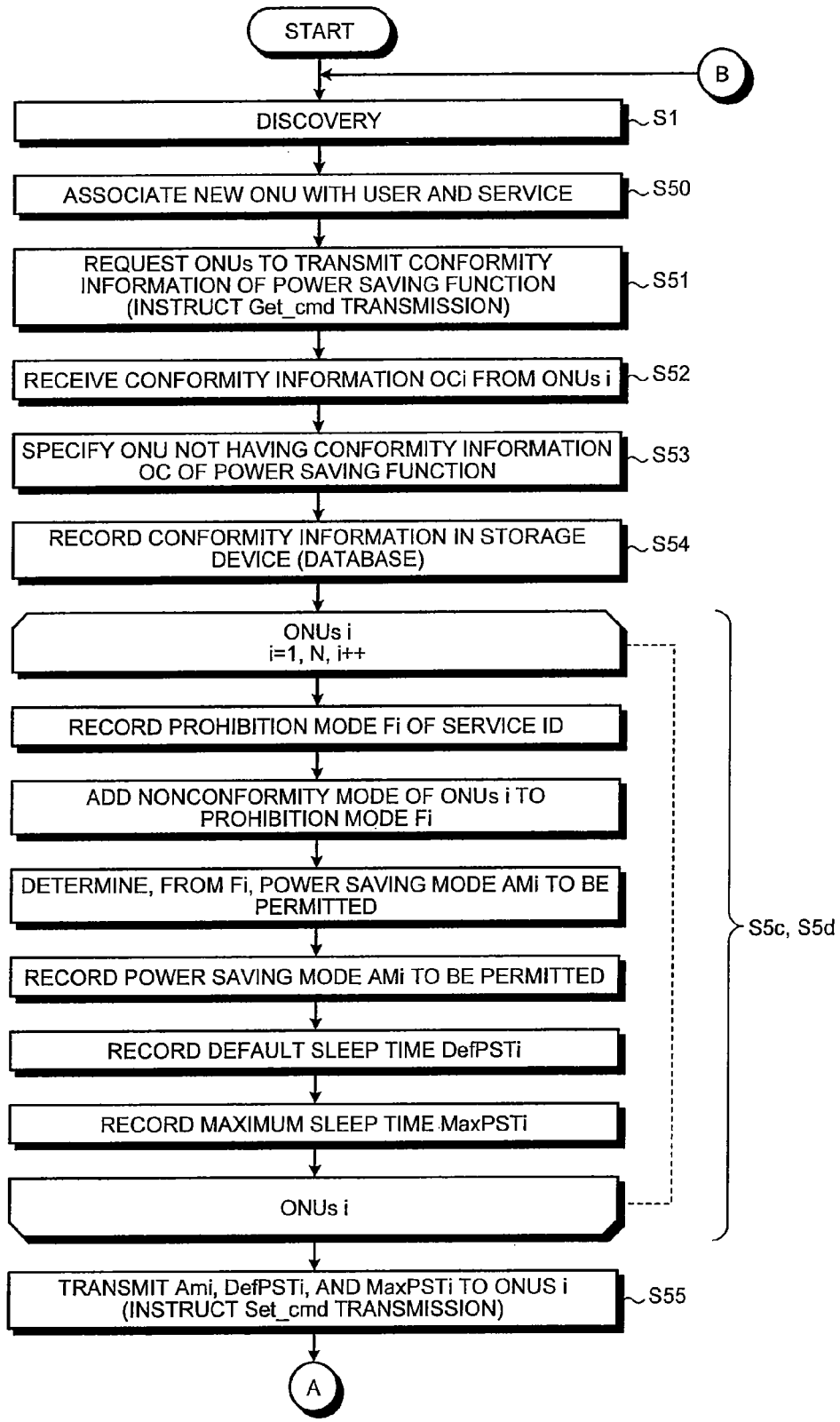
FIG. 8 is a flowchart for explaining configuration processing and the like of a control apparatus in a second embodiment of the present invention.

FIG. 8 is a flowchart for explaining processing of the PON control unit 2 in the OLT 1 according to a second embodiment. The PON control unit 2 according to the second embodiment is applicable to the communication system according to the first embodiment. The entire communication system is the same as that in the first embodiment.

The PON control unit 2 is a control apparatus used for a master machine such as the OLT 1 and includes a combination of a digital signal processor, a general-purpose processor, and software. These processors are integrated into a chip by a highly-integrated IC (Integrated Circuit) and coupled and combined with the optical transceiver 5 and the like by a signal line to thereby function as the OLT 1.

First, the PON control unit 2 starts discovery via the optical transceiver 5. Because a serial number of the ONU 10 is obtained in the discovery, the PON control unit 2 accesses, based on the serial number, a storage apparatus incorporated in or externally connected to the ONU 10 and specifies a user who uses the ONU 10. The PON control unit 2 performs association of the user and a service having a contract with the user (step S50). For example, an example of the association is shown in FIG. 11. The PON control unit 2 associates a serial number of an ONU and service information concerning an ID of a user and whether the user has a contract for business use or a general contract for a user in an ordinary home. The associated information includes information such as information concerning types of service lines (a IPTV, an IP phone, the Internet, etc.). In these service lines, service request conditions (QoS) such as guaranteed bandwidths, allowed delays, and the like of upstream and downstream are different depending on the types.

Configuration

Subsequently, the PON control unit 2 starts configuration of the ONU 10 equivalent to step S2 in FIG. 2. To request the ONUs 10 for support information (power_save_attr) of the power saving function, the PON control unit 2 generates a request message (Get_cmd) and transmits the request message to the ONUs 10 (step S51). At this point, the PON control unit 2 can also request attribute information of the other ONUs 10. The attribute information of the ONU 10 is information specified in, for example, ITU-T G.984.4 ONT management and control interface. A configuration method of the ONU 10 can be carried out in the same manner as that specified in ITU-T G.984.4 ONT management and control interface. The attribute information can be acquired using information and a method same as equivalent standards such as a standard XG-PON of the next generation to be established in future.

The PON control unit 2 acquires, from the buffer or the transceiver 5, support information OCi received by the transceiver from ONUs i (step S52). The PON control unit 2 compares the serial number of the active ONU 10 specified by the discovery and serial numbers of the ONUs 10 that transmits the support information OCi to thereby specify the ONU 10 not having the support information OCi of the power saving function as the ONU 10 not having the power saving function (step S53). Even when the ONU 10 transmits, using a Get_rsp message, the support information OCi indicating that the ONU 10 does not support the power saving function, the PON control unit 2 also specifies the ONU 10 as the ONU 10 not having the power saving function.

The PON control unit 2 writes the support information in, for example, an incorporated storage device in association with the ONU 10 in a form shown in FIG. 11 (step S54). The support information acquired by the PON control unit 2 includes not only a power saving mode but also various parameters concerning the power saving function such as the sleep time. Therefore, although not shown in FIG. 11, the PON control unit 2 records those various parameters in the storage device as well.

The PON control unit 2 accesses a service database (a storage device) shown in FIGS. 11 to 15 and determines power saving modes allowed to N ONUs i and power saving parameters (steps S5c and S5d). This determination can be carried out according to, for example, a method explained below.

The PON control unit 2 reads out, based on user identifiers (IDs) associated with the ONUs i, a service ID with which the user has a contract from the storage device (see FIG. 11) and specifies, from information tables respectively shown in FIGS. 12 and 13, power saving modes Fi prohibited concerning the respective service IDs. At this point, prohibited modes for the ONUs i can be determined by any algorithm. However, when "disapproved" is set to a power saving mode in FIG. 12 or FIG. 13, the PON control unit 2 sets the power saving mode in a prohibited mode.

The PON control unit 2 specifies power saving modes of the ONUs i themselves from an information table shown in FIG. 11 and excludes the power saving modes Fi from power saving modes designated in the information table to thereby determine power saving modes AMi to be allowed. The allowed power saving modes Ami are stored in the storage device.

The PON control unit 2 stores a default value DefPSTi of time in the storage device (FIG. 15). The default value DefPSTi is one of parameters concerning the power saving function and acquired from the ONU 10. The PON control unit 2 can adjust this default value DefPSTi using a regulation value or a default value set in advance according to a service in the same manner as adjusting a power saving mode based on a service. For example, when a default value of the Sleep time notified by the ONU 10 is excessively long, communication quality of upstream communication is deteriorated or downstream traffic presses a storage area of a reception buffer of the OLT 1. Therefore, the PON control unit 2 adjusts the sleep time. Similarly, the PON control unit 2 stores a maximum sleep time MaxPSTi in the storage device as well (see FIG. 14). This maximum sleep time is a regulation value in dynamically adjusting the sleep time. The PON control unit 2 can use MaxPSTi as a determination condition for an alarm such as LOSi.

It is advisable that the OLT 1 stores, as the tables shown in FIGS. 14 and 15, two kinds of tables: a table stored by the OLT 1 in advance and a table determined as a result of a negotiation with the ONU 10.

When the allowed modes Ami, the default sleep time DefPSTi, and the maximum sleep time MaxPSTi concerning a power saving mode are determined for the ONUs 10, the PON control unit 2 notifies the ONU 10 of these parameters using a message (Set_cmd). After receiving Set_cmd, the ONU 10 records these parameters in the storage device of the ONU 10 and uses the parameters for control of a sleep protocol.

Sleep Mode Control

Figure 9:
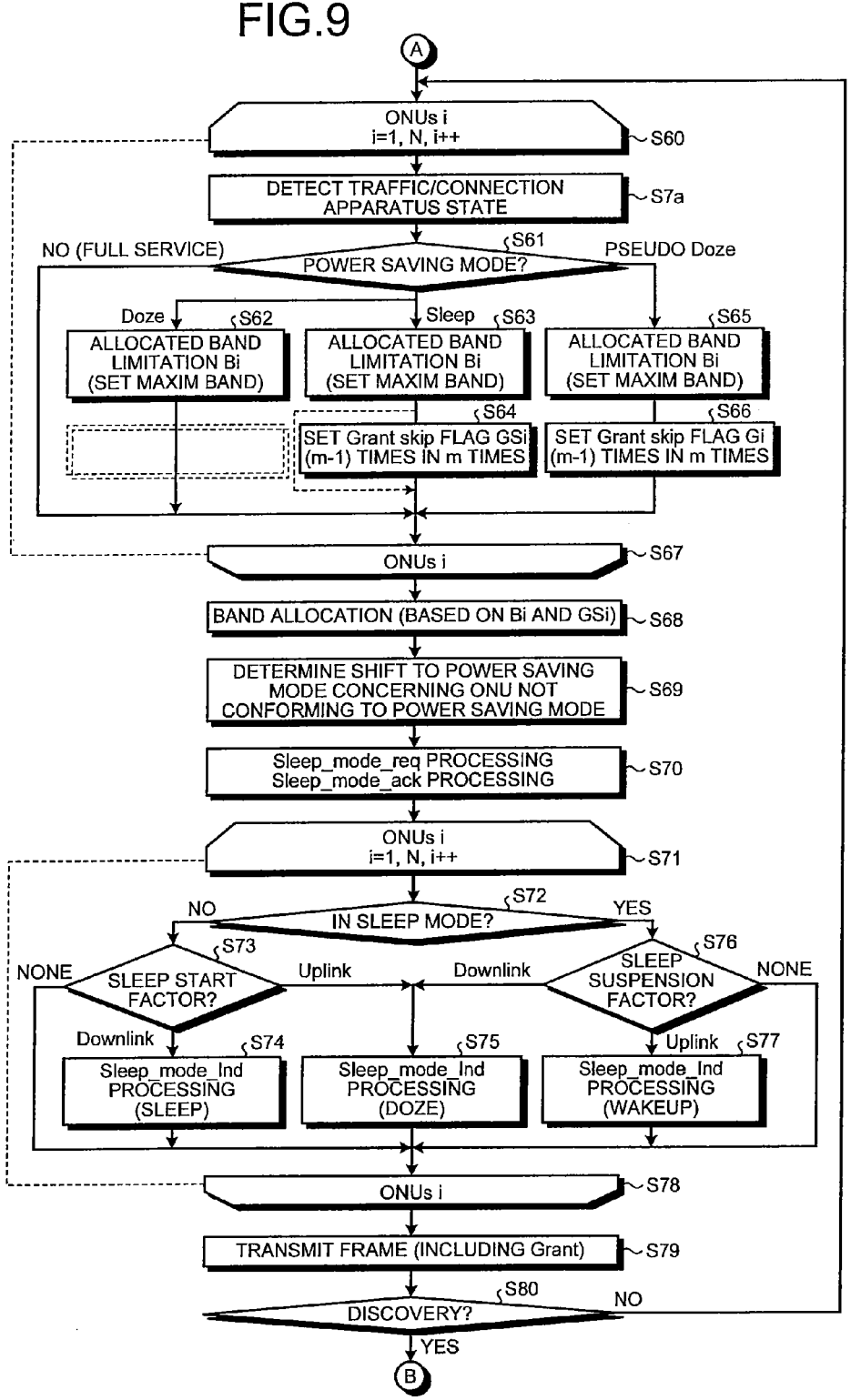
FIG. 9 is a flowchart for explaining a sleep mode control and the like of the control apparatus in the second embodiment of the present invention.

The control of the sleep mode by the PON control unit 2 is explained with reference to FIG. 9. A connector indicated by [A] in FIG. 9 indicates that a flow in FIG. 9 is continuation of a flow indicated by [A] in FIG. 8. First, at steps S60 to S68, the PON control unit 2 performs bandwidth allocation control in a power saving mode. The OLT 1 detects upstream and downstream traffic or a state of a connected apparatus of the ONU 10 from states of the buffers 3 and 4 of the OLT 1, information transmitted from the ONU 10, and the like. This state information is used for bandwidth allocation at step S68 and determination of a shift to a power saving mode at step S69.

The PON control unit 2 checks a present power saving mode of the target ONU 10 and performs limitation of a bandwidth allocation amount corresponding to the modes and limitation of chances of giving Grant (step S61). When the ONU 10 is in a state (a full service mode) that is not a power saving mode, the PON control unit 2 does not perform bandwidth allocation limitation due to the power saving mode. When the power saving mode is the doze mode, the PON control unit 2 limits allocated bandwidth limitation Bi of upstream communication to a value set in advance or a value set according to a service (step S62). If the mode is the sleep mode, the PON control unit 2 sets Bi in the same manner as step S62 (step S63) and limits chances of Grant to once in m times of a bandwidth update period (step S64).

For example, a grant skip flag GSi is set as a flag for not allocating a transmission chance in the bandwidth update period at step S68. When this flag is set, in the period, the PON control unit 2 does not give a transmission chance to the ONU i set with the flag. At step S64, the PON control unit 2 sets the flag GSi (m-1) times in m times to thereby give a transmission chance to the ONU 10 once in m times of the bandwidth transmission period. In the case of the pseudo doze mode, at steps S65 and S66, the OLT 1 executes processing same as steps S63 and S64.

The bandwidth allocation method corresponding to a power saving mode is an example. The PON control unit 2 can set, according to necessity, limitation and non-limitation of bandwidths and limitation and non-limitation of a transmission chance in the modes. For example, the PON control unit 2 can limit Grant and a chance of data transmission in an upstream even in the doze mode and can give Grant every time without applying the grant skip to the ONU 10 in the sleep mode. The bandwidth limitation is also arbitrary. For example, even if the allocated bandwidth limitation Bi is not set in particular, an allocation amount by the dynamic bandwidth allocation at step S68 is relatively smaller than those of the other ONUs 10 because of a state of upstream traffic from the ONU 10 or a small value of a bandwidth allocation request. Therefore, the PON control unit 2 can perform bandwidth allocation without distinguishing the ONU 10 in a power saving mode and the ONU 10 not in the power saving mode.

When the processing ends for all the ONUs 10, the PON control unit 2 allocates bandwidths to the ONUs 10. At this point, the grant skip flag GSi and the allocated bandwidth limitation Bi are used. First, the PON control unit 2 excludes the ONUs i set with the grant skip flag GSi from bandwidth allocation targets in the next period. Subsequently, the PON control unit 2 allocates bandwidths to the ONUs 10 using monitoring DBA (Dynamic Bandwidth Allocation), status report DBA, or a combination of the monitoring DBA and the status report DBA. At this point, the PON control unit 2 does not give bandwidths exceeding the allocated bandwidth limitation Bi to the ONUs i in a power saving mode. When the bandwidth allocation ends, the PON control unit 2 resets GSi and Bi.

Subsequently, the PON control unit 2 determines, concerning the ONU 10 not supporting the power saving function, based on a state of upstream traffic, whether the ONU 10 is shifted to a power saving mode (the pseudo doze mode) or a power saving mode is continued. For example, when traffic in a fixed period is smaller than a predetermined threshold, the PON control unit 2 shifts the ONU 10 to the power saving mode. The PON control unit 2 can also cause, based on a timer, the ONU 10 to operate in the power saving mode in a specific time frame.

At step S70, the PON control unit 2 performs processing for the request (sleep_mode_req) received by the optical transceiver 5 and transmission of sleep_mode_ack, which is a allowance signal to this request. Details of the processing of sleep_mode_req are explained later with reference to FIG. 10.

At steps S71 to S78, the PON control unit 2 performs change instruction control for a power saving mode by the OLT 1. According to this control, the OLT 1 can shift the ONU 10 under the OLT 1 from a power saving mode to the full service mode or shift the ONU 10 from a certain power saving mode to another power saving mode. As the communication system, it is made possible to perform a more efficient reduction in power consumption and improve communication quality.

The PON control unit 2 checks the storage device and detects whether the ONU i is in the sleep mode. When the ONU i is not in the sleep mode, at step S73, the PON control unit 2 checks whether there is a factor for start of the sleep mode. When the PON control unit 2 determines that there is no factor for start of the sleep mode, the PON control unit 2 shifts to processing at step S78 and repeats the same concerning the next ONU i.

On the other hand, when traffic decreases in a downstream or traffic decreases in an upstream, the PON control unit 2 shifts to processing at step S74 or S75 and performs preparation for transmission of sleep_mode_Ind to shift the ONU 10 to a power saving mode.

When the ONU 10 shifts to the sleep mode in a situation of the downstream (from the full service mode or the doze mode), the PON control unit 2 designates SLEEP as a power saving mode. When communication in the upstream continues, sleep is not selected. When the ONU 10 shifts to the power saving mode in a situation of the upstream, the PON control unit 2 designates DOZE as the power saving mode.

When the PON control unit 2 determines at step S72 that the ONU i is in the sleep mode, the PON control unit 2 detects a factor of suspension of the sleep mode (step S76). When there is no factor of suspension, the PON control unit 2 continues the sleep mode and shifts to processing of the next ONU 10. On the other hand, when a factor of suspension is the upstream, to stop the power saving mode and shift to the full service mode, the PON control unit 2 designates WAKEUP and performs preparation for transmitting sleep_mode_Ind (step S77). When the factor of suspension is the downstream, to shift the ONU 10 from the sleep mode to the doze mode, the PON control unit 2 designates WAKEUP as a mode and performs preparation for transmitting sleep_mode_Ind (step S77). In the figure, a change from the doze mode to the other modes is not described. However, it is also possible to specify transition from the respective power saving modes such as the doze mode to the other power saving modes, transition opposite to the transition, and start and suspension of the doze mode.

A factor of start and a factor of suspension of the sleep can be any factors as long as the factors are criteria for keeping necessary communication quality while suppressing power consumption. For example, a traffic amount in a fixed period, a data amount accumulated in the buffer, ON and OFF information of a connected apparatus connected to the ONU 10, start of a new service, or the like is the criteria.

When the processing explained above ends, the PON control unit 2 generates a frame in which a result of the bandwidth allocation and the control message such a sleep_mode_ack or sleep_mode_Ind are stored and transmits the frame to the ONU 10 (step S79). At this point, the frame can store downstream data together with the control message.

The PON control unit 2 determines whether it is timing when discovery is necessary (step S80). If the discovery is necessary, the PON control unit 2 shifts to processing at step S1 in FIG. 8 (see connector [B]). If the discovery is unnecessary, the PON control unit 2 returns to step S60 and shifts to transmission control in the next bandwidth update period.

Processing of the Request (sleep_mode_req)

Figure 10:
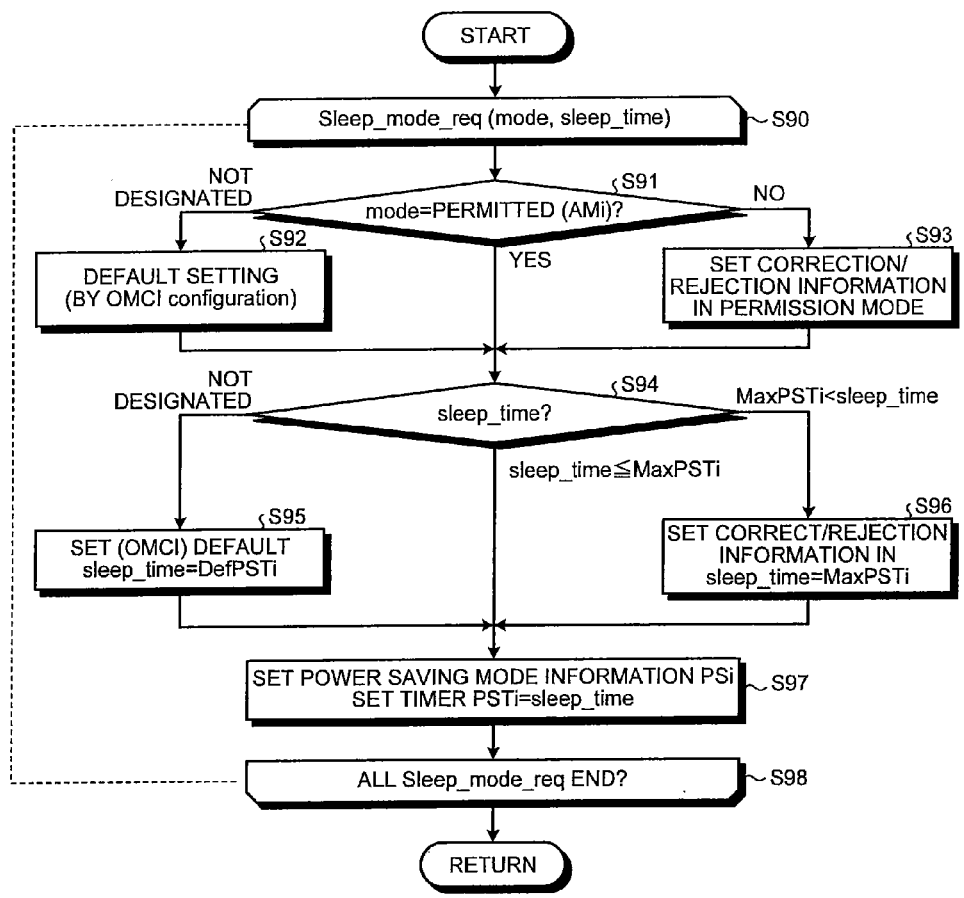
FIG. 10 is a flowchart for explaining sleep mode request processing and the like of the control apparatus in the second embodiment of the present invention.

FIG. 10 is a diagram of an example of processing of the request (sleep_mode_req) by the PON control unit 2. When the PON control unit 2 receives sleep_mode_req from the ONU 10, the PON control unit 2 determines whether a request from the ONU 10 is allowed or changed and returns a result of the determination as a sleep_mode_rsp message. This processing is shown in FIG. 10.

At step S91, the PON control unit 2 checks, by accessing the storage device, whether a power saving mode designated as a parameter in sleep_mode_req is included in the allowed modes AMi of the ONU i. When the power saving mode is not designated, the PON control unit 2 sets the power saving mode to a default value of the power saving mode set beforehand by the configuration at step S2 or the like in FIG. 2 (step S92). On the other hand, when the designated mode is not present in the allowed modes AMi, the PON control unit 2 corrects the designated mode to a allowed mode or sets rejection information with respect to a shift to the power saving mode (step S93). When the PON control unit 2 changes a power saving mode designated from the ONU 10, the PON control unit 2 has to be careful not to deteriorate communication quality.

When the processing ends or the designated mode is the allowed mode Ami, the PON control unit 2 shifts to processing at the next step S94. At this step, the PON control unit 2 checks, by accessing the storage device, whether the sleep time designated as a parameter in sleep_mode_req is within the maximum sleep time MaxPSTi set for the ONU i (step S94). When the sleep time is not designated, the PON control unit 2 sets the default value DefPSTi of the sleep time set beforehand by the configuration at step S2 or the like in FIG. 2 in the sleep time (step S95). On the other hand, when the designated sleep time is larger than MaxPSTi, the PON control unit 2 corrects the sleep time to MaxPSTi or sets rejection information with respect to a shift to a power saving mode (step S96).

When the processing ends or sleep time MaxPSTi, the PON control unit 2 records power saving mode information PSi in the storage device as information concerning a power saving mode of a corresponding ONU and, at the same time, sets the sleep time in the timing of Grant at steps S64, S66, and S68 in FIG. 9 and a timer PSTi serving as a reference for suppressing a warning during power saving.

When this processing ends the PON control unit 2 repeats the processing for all received sleep_mode_req.

The embodiments of the present invention are explained above. The present invention is not limited to these embodiments. Any modification can be performed as long as the modification is included in the spirit of the present invention. For example, the communication system to which this communication method is applied does not need to be the PON system. The communication method can also be applied to an optical communication system including an active element. The communication method is not limited to optical communication and can be applied to a communication system in which terminals communicate using an electric signal.

In the embodiment above, the OLT 1 can control the power saving function on the communication system in consideration of the function or provided service of ONU 10 by indicating a shift to a power saving mode and conditions (parameters) to the ONU 10. Concerning this function, it is a matter of selection whether or not the OLT 1 transmits a transmission allowance signal based on support information of the power saving function.

As the power saving modes, the doze mode, the sleep mode, and the pseudo doze mode are described as examples.

However, the power saving modes and the protocols thereof are not limited to these modes. The doze mode can be named sleep mode 1 and the sleep mode can be named sleep mode 2. Mode parameters corresponding to the modes can be encoded as "1" for the sleep mode 1 and as "2" for the sleep mode 2.

As an example of the power saving protocol, the power saving protocol in which, in shifting to the doze mode, the ONU 10 transmits a request to the OLT 1 and, when a response is received from the OLT 1, the ONU 10 shifts to the doze mode is explained. However, it is also possible to control the power saving state using other power saving protocols. For example, it is also possible that the OLT 1 and the PON control unit 2 thereof determine according to the support information of the power saving function that the ONU 10 is the ONU 10 that supports the doze mode and, if the ONU 10 does not return a response signal such as Idle frame in an allocated bandwidth, the OLT 1 determines that the ONU 10 has shifted to the doze mode and thereafter communicates with the ONU 10 according to the protocol of the doze mode.

INDUSTRIAL APPLICABILITY

The present invention is suitable for a communication method and a communication system in which power saving is necessary.

REFERENCE SIGNS LIST

1 OLT
2 PON CONTROL UNIT
3, 13 RECEPTION BUFFERS
4, 12 TRANSMISSION BUFFERS
5, 14 OPTICAL TRANSCEIVER
6 WDM
7 PHY
10-1 to 10-3 ONUs
11 PON CONTROL UNIT
20-1, 20-2 TERMINALS
30 SUBSCRIBER LINE
40 SPLITTER
51, 142, 161-1, 161-2 Rx
52, 141, 162-1, 162-2 Tx

The invention claimed is:

1. A communication system in which a plurality of user-side optical line terminating apparatuses (Optical Network Units, hereinafter referred to as ONUs) and station-side optical line terminating apparatus (Optical Line Terminal, hereinafter referred to as OLT) are connected with a common optical fiber,
    wherein the ONUs each include:
        an ONU side optical transceiver having a transmitting function that is configured to be turned off in a period of sleep time to reduce power consumption in a power saving mode; and
        an ONU control device configured to receive the period of sleep time from the OLT and store the period of sleep time, and turn off, upon receiving an instruction for shifting to the power saving mode from the OLT, the transmitting function of the ONU side optical transceiver in the period of sleep time designated by the OLT via the ONU side optical transceiver,
    wherein the OLT includes:
        an OLT side optical transceiver connected to the optical fiber; and
        an OLT control device configured to send separate messages to each of at least two ONUs to separately designate the period of sleep time for each of the at least two ONUs via the OLT side optical transceiver.

2. The communication system according to claim 1, wherein
    the OLT control device is configured to transmit an instruction for shifting to the power saving mode to the ONU via the OLT side optical transceiver.

3. The communication system according to claim 1, wherein
    the ONU control device is configured to turn-off the transmitting function of the ONU side optical transceiver in the period of sleep time, the period of sleep time being a maximum sleep time allowed by the OLT.

4. The communication system according to claim 1, wherein the transmitting function is configured to be powered-off and powered-on repeatedly in the power saving mode.

5. A station-side optical line terminating apparatus connected to a plurality of user-side optical line terminating apparatuses with a common optical fiber, the station-side optical line terminating apparatus comprising:
    an optical transceiver connected to the optical fiber; and
    a control device configured to send separate messages to each of at least two user-side optical line terminating apparatuses to separately designate a period of sleep time for each of the at least two user-side optical line terminating apparatuses via the optical transceiver, wherein
    the period of sleep time sent from the control device is received and stored at each of the at least two user-side optical line terminating apparatuses, and a transmitting function in each of the at least two user-side optical line terminating apparatuses are turned off in the period of sleep time in a power saving mode to reduce power consumption upon receiving an instruction for shifting to a power saving mode from the station-side optical line terminating apparatus.

6. The station-side optical line terminating apparatus according to claim 5, wherein
    the control device is configured to transmit an instruction for shifting to the power saving mode to the user-side optical line terminating apparatus.

7. The station-side optical line terminating apparatus according to claim 5, wherein the transmitting function is configured to be powered-off and powered-on repeatedly in the power saving mode.

8. A user-side optical line terminating apparatus for a communication system in which a plurality of the user-side optical line terminating apparatuses are connected to a station-side optical line terminating apparatus with an optical fiber, the user-side optical line terminating apparatus comprising:
    an optical transceiver, connected to the optical fiber, and having a transmitting function that is configured to be turned off to reduce power consumption in a power saving mode; and
    a control device configured to receive a message separately sent to each of at least two user-side optical line terminating apparatuses, via the optical transceiver, to separately designate a period of sleep time for each of the at least two user-side optical line terminating apparatuses, store the period of sleep time, and turn off, upon receiving an instruction for shifting to the power saving mode from the station-side optical line terminating apparatus, the transmitting function of the optical transceiver in the period of sleep time.

9. The user-side optical line terminating apparatus according to claim 8, wherein the transmitting function is configured to be powered-off and powered-on repeatedly in the power saving mode.

10. The user-side optical line terminating apparatus according to claim 8, wherein
the control device is configured to turn off the transmitting function of the optical transceiver in the period of sleep time, the period of sleep time being a maximum sleep time allowed by the station-side optical terminating apparatus.

11. A communication method for a communication system in which a plurality of slave station apparatuses are connected to a master station apparatus by a communication line, the communication method comprising:
transmitting, by the master station apparatus, separate messages to each of at least two slave station apparatuses to separately designate a period of sleep time for turning off a transmitting function in each of the at least two of the slave station apparatuses;
receiving the period of sleep time from the master station apparatus at each of the at least two slave station apparatuses;
storing the period of sleep time at each of the at least two slave station apparatuses; and
turning off the transmitting function in each of the at least two slave station apparatuses in the period of sleep time, upon receiving an instruction for shifting to a power saving mode from the master station.

12. The communication method for a communication system according to claim 11, wherein the transmitting function is configured to be powered-off and powered-on repeatedly in the power saving mode.

13. A control apparatus of a master station apparatus connected to a plurality of slave station apparatuses using an optical fiber and configured to communicate with the slave station apparatuses via an optical transceiver, wherein:
in a power saving mode in which a transmitting function of the slave station apparatus is turned off in a period of sleep time, the control apparatus is configured to send separate messages to each of at least two slave station apparatuses to separately designate the period of sleep time for each of the at least two slave station apparatuses, via the optical transceiver and
the period of sleep time sent from the control device is received and stored at each of the at least two slave station apparatuses, and the transmitting function in each of the at least two slave station apparatuses is turned off in the period of sleep time in the power saving mode to reduce power consumption.

14. The control apparatus of a master station apparatus according to claim 13, wherein the transmitting function is configured to be powered-off and powered-on repeatedly in the power saving mode.

15. A control apparatus of a slave station apparatus for a communication system in which a plurality of slave station apparatuses are connected to a master station apparatus using an optical fiber and configured to communicate with the master station apparatus using an optical transceiver, wherein:
the control apparatus receives a message separately sent by the master station apparatus to each of at least two slave station apparatuses, via the optical transceiver, to separately designate a period of sleep time for each of the at least two slave station apparatuses, stores the period of sleep time, and turns off a transmitting function of the optical transceiver in the period of sleep time, upon receiving an instruction for shifting to the power saving mode.

16. The control apparatus of a slave station apparatus according to claim 15, wherein the transmitting function is configured to be powered-off and powered-on repeatedly in the power saving mode.

* * * * *